INVENTOR
ADOLF FEHLER

United States Patent Office 3,606,905
Patented Sept. 21, 1971

3,606,905
PRESSURE-MAINTAINING AND DRAINAGE VALVE OF A GAS TURBINE ENGINE
Adolf Fehler, Puchheim, Germany, assignor to Motoren- und Turbinen-Union Muenchen G.m.b.H., Munich, Germany
Filed Sept. 30, 1969, Ser. No. 862,317
Claims priority, application Germany, Oct. 10, 1968, P 18 02 275.8
Int. Cl. F16k *15/02*
U.S. Cl. 137—107                                      10 Claims

ABSTRACT OF THE DISCLOSURE

A pressure-maintaining and drainage valve for gas turbine engines in which a double-ended nipple is screwed into each end of the valve body cylinder accommodating a reciprocating spool-type control piston valving control openings in the cylinder; the spool-type control piston alternately abuts against seals provided at the mutually facing end faces of the nipple to seal off the communication through that nipple, against the seals of which it abuts.

---

Figure 1:
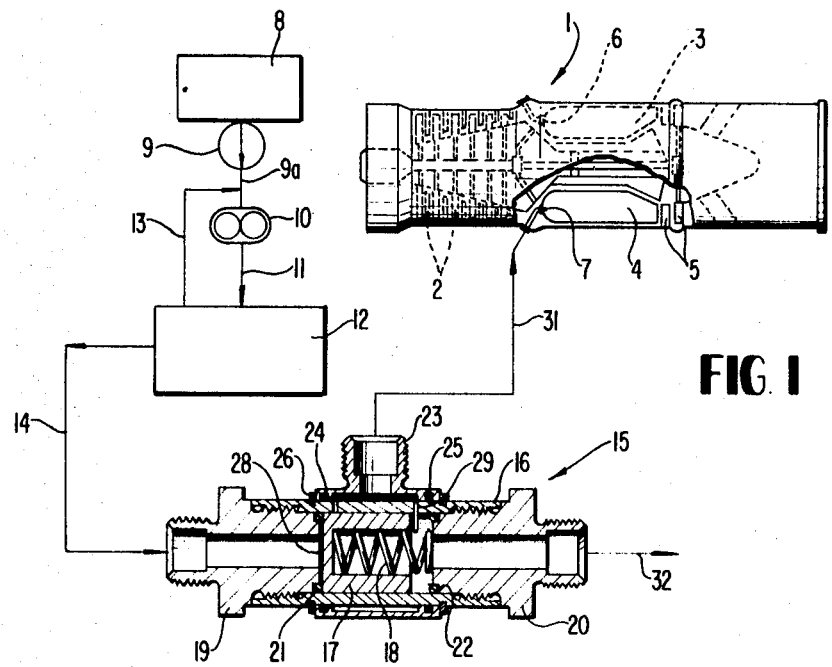

The present invention relates to a pressure-maintaining and drainage valve of a gas turbine engine with line connections, which are provided for the supply of fuel to the valve, the outlet of fuel from the valve to the fuel nozzle of the combustion chamber as well as for the drainage of fuel, and which includes a cylinder, in which a control piston or spool, adapted to be subjected to the fuel supply pressure and thus actuated against the action of a spring, alternately controls cylinder ports, of which some parts enable, with a turned-on fuel supply and subsequent release by the control piston connected therewith, the flow of fuel to the fuel nozzles, and are closed with a turned-off fuel supply as a result of the movement of the control piston or spool effected by the return spring, while at the same time further ports in the cylinder are cleared or released by the return movement of the control piston or spool permitting a discharge or drainage of the fuel remaining in the fuel nozzles into the drainage line.

In the operation of modern gas turbine engines, one encounters constantly the problem of draining the unusued fuel from the fuel nozzles after the engine has been shut down. When the engine is shut down, fuel collects in the combustion chambers as a result of drainage out of the line leading from the fuel tank, so that when the engine is started again, the thus-collected fuel may lead to immediate combustion and consequently an excess temperature may result in the combustion chamber. This excess in temperature can lead to a damaging of the engine, and it is therefore recommended to drain this fuel from the engine when shutting down the latter.

For this purpose, a pressure-maintaining and drainage valve has been proposed aldeady in British Pat. 1,034,758, for a gas turbine engine fuel system, which corresponds in its essential parts to that of the type described above. This known pressure-maintaining and drainage valve, however, only fulfills extraordinarily incompletely the requirements, which are demanded of such a valve in practice.

The pressure-maintaining and drainage valve must be able to cut off completely the fuel supply to the fuel nozzle, notwithstanding a turned-on supply pump. The pressure-maintaining and drainage valve must, in addition, open under a minimum fuel supply pressure and must assure a rapid, reliable change-over during starting of the engine to supply fuel to the fuel nozzle. During engine operation, the drainage line must further be hermetically sealed with respect to the fuel flowing through the valve, in order to prevent fuel losses.

Moreover, the pressure-maintaining and drainage valve must be able to stop the flow of fuel to the fuel nozzle completely satisfactorily when the fuel pressure produced by the supply drops below a minimum fuel supply pressure, while at the same time the connection of the fuel nozzle to the drainage pipe is established, in order to blow out the fuel, remaining in the fuel nozzle, into the drainage line.

Finally, such a pressure-maintaining and drainage valve must be constucted in a study and simple manner for the realization of the described control cycles, and under continuous operation must be operationally reliable and be subjected only to slight wear.

The pressure-maintaining and drainage valve described in British Pat. 1,034,758 is able to fulfill these requirements only to a highly inadequate extent.

In this known valve, the spool or control piston slides within the cylinder by means of O-rings surrounding the same, which are to prevent a fuel leakage. These O-rings are subjected to heavy wear when valving the cylinder bores or ports and in addition prevent the spool from sliding freely, which is desired in order to be able to take into account the rapid change-over operations demanded of such a valve.

Under continuous operation, these O-rings of the spool or control piston thus lead to leakages and possibly even to seizure of the spool.

In addition, in this prior art arrangement of the spool-type control piston, when in a neutral, rest position, closes off the valve only inadequaqtely with respect to the fuel feed line, and more particularly by reason of a metal seal, provided for this purpose, against a loose stop, whereby already the supply pressure from the tank pump is, in itself, sufficient to permit small fuel leakage quantities to reach the injection nozzle of the combustion chamber, which can become extremely detrimental during ignition of the engine.

In addition, with this known, prior art valve, a large number of additional seals are required, which must seal seal the cylinder against an external shroud also necessary in this case.

It is, therefore, the aim of the present invention to eliminate the disadvantages inherent in the prior art pressure-maintaining and drainage valve and to create a valve of such type which enables a simple construction and therewith a manufacture at reduced costs, and which, on the other hand, under continuous operation is subjected to slight wear and which makes possible a rapid fool-proof control of the ports provided for the fuel supply to the fuel injection nozzle and for the fuel drainage from the fuel nozzle into the drainage line, inclusive a completely satisfactory seal of the drainage line, when the fuel nozzle is being supplied with fuel, as well as a completely satisfactory closure of the fuel feed line when the fuel remaining in the fuel nozzle is blown out into the drainage line.

As solution to the underlying problems, the present invention primarily proposes, in the case of a valve of the above-mentioned type, that the line connections for the fuel supply into the valve as well as for the fuel drainage are double-ended connecting nipples threadably connected with the two ends of the cylinder, whose end faces, which face each other within the cylinder, are provided with seals arranged between the double-ended nipples and the cylinder, against which the control piston or spool alternately abuts after having valved the openings constructed as control ports or slots, whereby simultaneously with the abutment of the control piston or spool against a seal, one of the control ports or control slots as well as the fuel supply out of one or into one of the two double-ended nipples are closed off.

With the valve of this invention, the end faces of the double-ended nipples, projecting far into the cylinder, enable the desired, extremely short control strokes and thus a rapid actuation and operation of the valve in conjunction with an extraordinarily slight fuel leakage during the change-over operation.

The seals arranged at the end faces of the double-ended nipples seal off the cylinder against leakage to the outside and moreover see to it that simultaneously with the abutment of the control piston or spool against a seal, one of the control ports and the drainage line or fuel supply to the valve are satisfactorily cut off. In addition thereto, these seals effect a damped abutment of the control piston or spool.

In a further embodiment of the present invention, the line connection for the fuel supply to the fuel nozzle surrounds the cylinder and its control ports in a swiveling and sealing manner and is secured at the cylinder with retainer rings against axial displacement.

Figure 2:
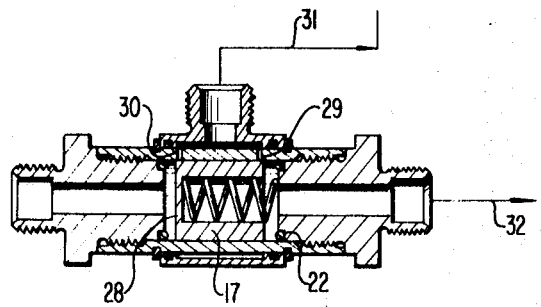
Figure 3:
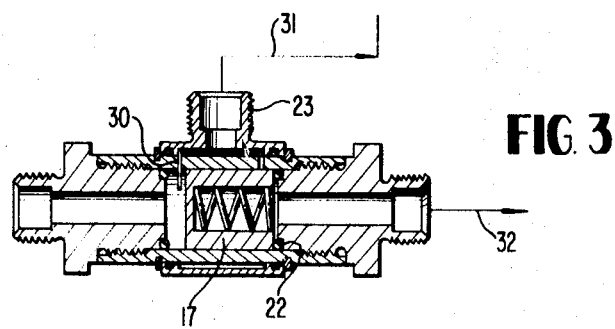

These and further objects, features and advantages of the present invention will become more obvious from the following description when taken in connection with the accompanying drawing which shows, for purposes of illustration only, one embodiment in accordance ith the present invention, and wherein:

FIG. 1 is a center longitudinal cross-sectional view of a pressure-maintaining and drainage valve according to this invention in the position: fuel supply and fuel return or outlet closed, drainage open, inclusive a gas turbine engine with its associated fuel system only schematically illustrated;

FIG. 2 is a center longitudinal cross-sectional view of the pressure-maintaining and drainage valve illustrated in FIG. 1, but in the position: fuel supply open, fuel return or outlet and drainage closed; and FIG. 3 is a center longitudinal cross-sectional view of the pressure-maintaining and drainage valve illustrated in FIG. 1, but differing from FIGS. 1 and 2 in the position: fuel supply and fuel return or outlet open, and drainage closed.

Referring now to the drawing wherein like reference numerals are used throughout the various views to designate like parts, the gas turbine engine 1, illustrated by way of example in FIG. 1, is of known type, consisting connected in series, of a compressor 2, of combustion chambers 3, 4, and of a turbine 5 adjoining the latter. Reference numerals 6 and 7 designate the fuel nozzles of the combustion chambers 3 and 4. The fuel system belonging to the engine consists, fundamentally, of a fuel tank 8, to which is attached a supply pump 9, from which a supply line 9a leads to a fuel pump 10, which supplies the fuel to a fuel control unit 12 by way of a further line 11. The fuel control unit 12 is connected to a pump return line 13, which is connected with the supply line 9 upstream of the pump 10. The fuel control unit 12 supplies the fuel quantity necessary for the operation of the gas turbine engine 1 by way of a line 14 to the pressure-maintaining and drainage valve generally designated by reference numeral 15.

As can be seen from FIG. 1, the pressure-maintaining and drainage valve 15 consists of a cylinder 16, in which are positioned a spool-type control piston 17 and a compression spring 18. A threaded double-ended nipple 19 and 20 is screwed into a respective end of the valve body, whereby seals 21 and 22 are supported on the end faces of the double-ended nipples 19, 20. A pivotal or swivelling connection is guided along the outer diameter of the valve body in which are supported two seals 24, 25, and which is fixed laterally at the cylinder 16 by means of two retainer rings 26, 27.

During engine operation fuel flows by way of line 14 into the double-ended nipple 19 and acts upon the spool area 28, displaces the spool under pressure against the spring 18 and closes the control port or slot 29 (FIG. 2), while the control port or slot 30 is still closed; as the result of an increase in pressure, the spool or control piston 17 comes into contact with and abuts against the seal 22 (FIG. 3) and clears the control port or slot 30 and therewith fuel flows by way of the swivelling connection 23 and the line 31 (FIG. 1) to the fuel nozzles 6, 7. If the engine and therewith the fuel supply are shut down, the spool-type control piston 17 moves toward and abuts against the seal 21 (FIG. 1) and thereby clears or opens the control port or slot 29, and the fuel, which is still in the fuel nozzles 6, 7 and in the line 31, flows off into the drainage line 32, due to the gas pressure still present in the combustion chambers 3, 4, by way of the swivelling connection 23, the control port 29 and the double-ended nipple 20.

The control piston or spool 17 is lapped into the cylinder 16 thus guaranteeing a smooth, free movement and a reliable, completely satisfactory valving of control ports 29 and 30. The double-ended nipples 19 and 20 are so designed and constructed that the seals 21 and 22 thereof serve simultaneously as a stop for the spool 17 and as end face seal; this enables a reliable, perfect sealing in the neutral position as well as under all the other operating conditions. The seals 21, 22, 24, 25 provided for the pressure-maintaining and drainage valve can be O-rings of any generally conventional design made from any conventional, known wear-resisting material.

The gas turbine engine depicted in FIG. 1 does not represent a limitative type of embodiment for the use of the pressure-maintaining and drainage valve according to the present invention. The proposed pressure-maintaining and drainage valve may be used equally well, for example, in multi-shaft gas turbine engines as in gas turbine engines for stationary operation, which are equipped with can-type or annular combustion chambers or with one or more fuel injection nozzles.

Thus, while I have shown and described only one embodiment in accordance with the present invention, it is obvious that the same is not limited thereto but is susceptible of numerous changes and modifications as known to those skilled in the art, and I therefore do not wish to be limited to the details shown and described herein but intend to cover all such changes and modifications as are within the scope of those skilled in the art.

What is claimed is:

1. A pressure-maintaining and drainage valve for a gas turbine engine with line connecting means, which are provided for the supply of fuel to the valve, the discharge of fuel out of the valve to fuel nozzle means of a combustion chamber means as well as for the drainage of fuel, and which includes a cylinder means, in which a control piston means operable to be subjected to fuel supply pressure and thus actuated by the fuel pressure against the action of a spring, alternately controls aperture means in the cylinder means, some of said aperture means consisting of control slots enabling the flow of fuel to the fuel nozzle means with a turned-on fuel supply and the ensuing opening up thereof by the piston means and are closed with a turned-off fuel supply due to the movement of the piston means effected by the spring, whereas simultaneously therewith further aperture means consisting of control slots in the cylinder means are opened up by the return movement of the piston means and enable a discharge into a drainage line of the fuel remaining in the fuel nozzle means, characterized in that the connecting means for the fuel supply into the valve as well as for the fuel drainage are double-ended nipple means threadably secured with both ends of the cylinder means, the end faces of said nipple means which face each other in the cylinder means, being provided with seal means arranged between the double-ended nipple means and the cylinder means in a recess of said nipple means, and the control piston means alternately abutting against the seal means upon valving the control slots, whereby substantially at the same time as the piston means abuts against a respective seal means, one of the control slots as well as the fuel flow out of one or into one of the two double-ended nipple means is closed off.

2. A pressure-maintaining and drainage valve according to claim 1, characterized in that the line connecting means for the fuel supply to the fuel nozzle means surrounds the cylinder means and its aperture means in a swivelling and sealing manner and is secured at the cylinder means against axial displacement by retainer ring means.

3. A pressure-maintaining and drainage valve according to claim 2, characterized in that the cylinder means is provided with two control apertures in communication with the line connecting means leading to the nozzle means, said control apertures being spaced from each other in the axial direction of the cylinder means, and said piston means valving said control apertures by its external surface during movement in the axial direction and having an effective length in said axial direction greater than said spacing.

4. A pressure-maintaining and drainage valve according to claim 3, wherein said piston means is hollow and accommodates said return spring.

5. A pressure-maintaining and drainage valve according to claim 3, characterized in that said seal means are O-rings, some of which are mounted over stepped ends of said nipple means.

6. A pressure-maintaining and drainage valve according to claim 1, characterized in that the cylinder means is provided with two control apertures in communication with the line connecting means leading to the nozzle means, said control apertures being spaced from each other in the axial direction of the cylinder means, and said piston means valving said control apertures by its external surface during movement in the axial direction and having an effective length in said axial direction greater than said spacing.

7. A pressure-maintaining and drainage valve according to claim 7, wherein said piston means is hollow and accommodates said return spring.

8. A pressure-maintaining and drainage valve according to claim 6, characterized in that the nipple means extend relatively far into the cylinder means and the stroke of the piston means is relatively short.

9. A pressure-maintaining and drainage valve according to claim 8, characterized in that the valving of said control apertures is completed prior to abutment of the piston means against a respective seal means.

10. A pressure-maintaining and drainage valve according to claim 1, characterized in that said means are O-rings, some of which are mounted over stepped ends of said nipple means.

References Cited

UNITED STATES PATENTS

| | | | |
|---|---|---|---|
| 228,532 | 6/1880 | Hoyt | 137—107 |
| 2,821,972 | 2/1958 | Banker | 137—112X |
| 2,982,306 | 5/1961 | Fitzgibbon | 137—625.64 |
| 3,038,487 | 6/1962 | Gardner | 137—112 |
| 3,272,219 | 9/1966 | Frantz | 137—112 |
| 3,339,574 | 9/1967 | Erb et al. | 137—102 |

FOREIGN PATENTS

| | | | |
|---|---|---|---|
| 923,745 | 4/1963 | Great Britain | 137—107 |

ROBERT G. NILSON, Primary Examiner

U.S. Cl. X.R.

137—516.29, 538